Sept. 10, 1929.  W. F. HEROLD  1,727,976
CASTER
Filed March 15, 1926
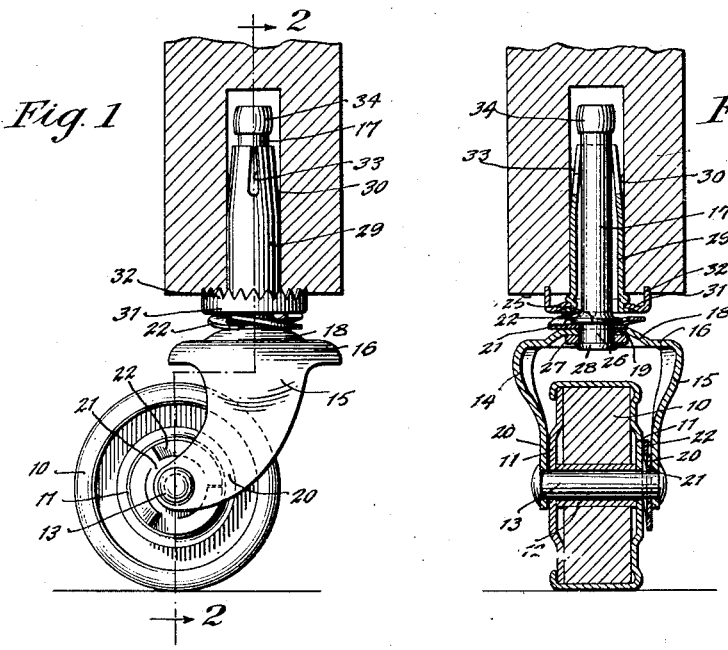
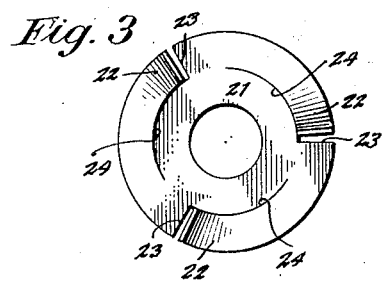
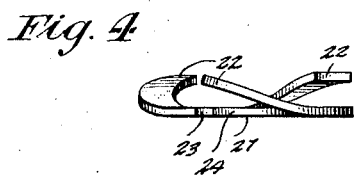
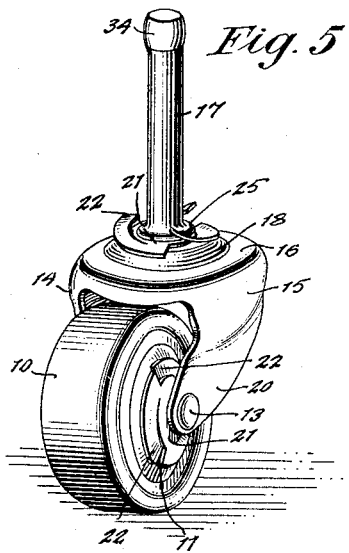
INVENTOR.
Walter F. Herold
BY
ATTORNEY Patented Sept. 10, 1929.

1,727,976

UNITED STATES PATENT OFFICE.

WALTER F. HEROLD, OF UPPER MONTCLAIR, NEW JERSEY, ASSIGNOR TO THE BASSICK COMPANY, OF BRIDGEPORT, CONNECTICUT, A CORPORATION OF CONNECTICUT.

CASTER.

Application filed March 15, 1926. Serial No. 94,738.

The present invention relates to an improved caster, particularly for use upon articles of furniture, portable machines, and the like, that are adapted normally to remain in a stationary position, an object of the invention being to provide a swivel caster in which both the rotation and swiveling of the caster wheel are yieldably resisted, so that while the object equipped with such casters may be moved about by exerting sufficient impelling pressure thereon, the same will be held against movement from such pressure, vibration, or other forces, as may be applied to the object during its normal use in stationary position. Washing and ironing machines, stands for typewriting, dictating, adding, book-keeping and like machines, bedsteads, office chairs, etc., are such objects to which the present type of caster may be applied advantageously.

A further object is to provide a caster including frictional resistance means applied to the wheel and swivel mounting in a manner to exert a uniform and evenly distributed resistance, to the end that a given pressure on the supported object to move it will produce an even rotational and swiveling movement of the caster.

Another object is to provide frictional resistance means to retard swiveling adapted to cooperate between the supported object and the caster mounting, whereby the weight of the object imparts the desired resistance tension to such means; and it is also proposed to provide such means which will compensate for irregularities between the floor and the supporting legs of the object, so that the same will be solidly supported at all times.

Another object is to provide an improved spring resistance element adapted to be applied both to the caster wheel and the swivel mounting, thereby greatly facilitating and economizing the manufacture and assembly of the complete caster; and further to provide such spring element in which a relatively great resistance force will be applied circumferentially within a relatively small diameter.

With the above and other objects in view, an embodiment of the invention is shown in the accompanying drawings, and this embodiment will be hereinafter more fully described with reference thereto, and the invention will be finally pointed out in the claims.

In the drawings:—

Fig. 1 is a side elevation of a caster, according to the present embodiment of the invention, and showing in section a furniture leg to which the same is attached;

Fig. 2 is a vertical sectional view, taken along the line 2—2 of Fig. 1;

Fig. 3 is a plan view of the spring resistance element employed in the present embodiment;

Fig. 4 is a side view thereof; and

Fig. 5 is a perspective view of the caster, detached.

Similar reference characters indicate corresponding parts throughout the several figures of the drawings.

Referring to the drawings, the embodiment of the invention shown therein comprises a caster wheel 10, having flat annular surfaces 11 at each side surrounding the axle opening 12, and rotatably supported upon an axle 13 secured at its ends in the downwardly extending side arms 14 and 15 of the horn, to the upper transverse portion 16 of which the pintle 17 is secured, said portion 16 being provided for this purpose with a circular raised boss 18 having a central pintle receiving aperture 19 and a flat annular surface surrounding said aperture. The side arms of the horn are provided adjacent the axle with flattened portions 20, substantially parallel to the flat annular surfaces 11 of the wheel.

The frictional resistance elements are adapted to be applied to the wheel at one side to cooperate between the flat annular surface 11 thereof and the flat surface 20 of the horn side arm, and at the base of the pintle to cooperate between the flat annular surface of the boss 18 and the base of the socket member, presently to be more fully referred to, and which is secured in the leg of the supported object. One of the elements resists rotation of the wheel, while the other resists swiveling, and both are of identical form, so that in assembling the caster they may be interchangeably used.

As shown in Figs. 3 and 4 the elements are in the form of a centrally apertured circular spring washer 21 having a series of circumferential upwardly bent spring arms 22, formed by slitting the washer radially at equally spaced points, as at 23, and circumferentially at equally spaced points, as at 24, one end of said slits 24 being connected to the respective radial slits 23, while the other end is spaced from the adjacent radial slit. This type of spring element provides relatively long spring arm portions within a relatively small diameter, and exerts its force in the circumferential direction of the rotational and swiveling movements of the caster wheel and pintle, so that an evenly distributed resistance is set up, and the relative movements of the caster parts will not tend to distort the spring element.

One of the resistance elements is mounted at one side of the caster wheel, upon the axle 13, with the spring arms 22 compressed under tension and pressing against the flat annular surface 11 of the wheel at one side, while the flat inner portion of the element engages the flat surface 20 of the horn arm, the engagement with both the wheel surface and the horn surface being substantially spaced from the axis of rotation, so that a substantial frictional resistance is set up between these flat surfaces; a further frictional resistance being set up between the flat surfaces of the wheel and horn arm at the other side.

The other resistance element is mounted upon the boss 18 of the horn, at the base of the pintle, and being fixedly secured through the attachment of the pintle. For this purpose, the pintle is provided with a shoulder 25 adapted to be engaged with the flat inner portion of the element, and a stud 26 engaged through the apertures of the element and the boss, and through a washer 27, being secured by heading over the lower end, as at 28. The element is thus permanently secured, with the spring arms 22 extended upwardly in annular surrounding relation about the axis of the pintle.

The socket member, in which the pintle is inserted and rotatably held, comprises a tubular portion 29 adapted to be inserted in a hole 30 in the leg of the supported object, and having secured at its lower end a base flange 31 having an upwardly bent toothed edge portion 32 adapted to be pressed into the under surface of the leg. The lower annular surface of the flange 31 is substantially flat and is adapted to be engaged by the spring arms 22, the weight of the supported object compressing and tensioning said arms to set up a frictional resistance to the swiveling movement of the caster.

The upper end of the socket tube 29 is slotted at opposed sides, as at 33, and is inwardly tapered to retain the pintle through abutment with the upper headed end 34 thereof, the tapered and slotted end adapted upon insertion of the pintle to be expanded by said headed end, and thereupon contracted beneath it. In addition to its function of imposing a frictional resistance on the swiveling movement of the caster, the spring frictional element will compensate for irregularities between the leg and floor, so that the supported object will be solidly supported at all times. The headed end 34 of the pintle is so arranged with respect to the upper end of the socket 29, that when the caster is disengaged from the floor the spring arms 22 will exert an outward pressure on the pintle and draw the head 34 into tight engagement with the upper end of the socket, so that looseness and rattling is prevented.

In operation, the caster will perform its normal functions of rolling and swiveling through sufficient impelling pressure exerted on the supported object, but will prevent movement of such object through such pressure, vibration, or other forces, as are imposed thereon during the normal stationary use thereof, and without the necessity for applying and releasing a brake or other such movement resisting means. The improved caster may be readily attached, as replacement equipment, upon objects already provided with sockets adapted for the securing of the usual type of caster.

I have illustrated and described a preferred and satisfactory embodiment of the invention, but it will be obvious that changes may be made therein, within the spirit and scope thereof, as defined in the appended claims.

Having thus described my invention, what I claim and desire to secure by Letters Patent is:—

1. In a caster, the combination of a wheel mounting frame, a wheel rotatably mounted in said frame, a swivel mounting for said frame adapted for attachment to an article to be supported, and resilient frictional resistance means fixedly secured to said frame in non-rotatable relation and adapted through the weight of the supported object to impose a constant resistance to swivelling on said frame and an outward pressure on said frame with respect to the supported object.

2. In a caster, the combination of a wheel mounting frame, a wheel rotatably mounted in said frame, a pintle secured to said frame, a socket in which said pintle is swivelly engaged and including an annular base portion, and a resilient resistance element fixedly secured against rotation with respect to said pintle and disposed between said frame and said socket base and including a plurality of circumferentially arranged spring arms adapted to frictionally engage said socket base upon an annular surface concentrically spaced from the axis of said pintle to resist swivelling and to exert an outward pressure on said frame with respect to said socket.

3. In a caster, the combination of a frame including downwardly extending side portions and a transverse connecting portion, a wheel rotatably mounted between said side portions, a pintle secured to said transverse frame portion, including a shoulder above said frame portion and a stud engaged through and secured to said frame portion, and a resistance element engaged upon said stud beneath said shoulder and secured thereby against rotation with respect to said pintle, and including spring portions disposed about said pintle adapted through the weight of the supported object to exert frictional resistance between said frame portion and the supported object to resist swiveling.

Signed at Newark, in the county of Essex and State of New Jersey, this 17 day of Feb., 1926.

WALTER F. HEROLD.